United States Patent [19]
Ohgi et al.

[11] Patent Number: 5,323,663
[45] Date of Patent: Jun. 28, 1994

[54] STARTER

[75] Inventors: Takahiro Ohgi, Obu; Yasuhiro Nagao, Okazaki; Kazuo Hirama, Obu; Youichi Hasegawa, Kasugai, all of Japan

[73] Assignee: Nippondenso Co., Ltd., Kariya, Japan

[21] Appl. No.: 928,705

[22] Filed: Aug. 13, 1992

[30] Foreign Application Priority Data

Aug. 22, 1991 [JP] Japan .................. 3-210999

[51] Int. Cl.⁵ .................. F02N 15/06; F16H 35/10
[52] U.S. Cl. .................. 74/7 E; 74/7 A; 475/265; 310/83
[58] Field of Search .................. 74/7 A, 7 E; 475/5, 475/263, 264, 265; 310/83

[56] References Cited

U.S. PATENT DOCUMENTS

| | | | |
|---|---|---|---|
| 4,494,414 | 1/1985 | Hamano | 74/7 E |
| 4,503,719 | 3/1985 | Hamano | 74/7 E |
| 4,528,470 | 7/1985 | Young et al. | 74/7 E |
| 4,635,489 | 1/1987 | Imamura et al. | 74/7 E |
| 4,680,979 | 7/1987 | Morishita et al. | 74/7 E |
| 4,831,895 | 5/1989 | Tanaka et al. | 74/7 E X |

FOREIGN PATENT DOCUMENTS

| | | |
|---|---|---|
| 0127372 | 5/1984 | European Pat. Off. . |
| 0180016 | 9/1985 | European Pat. Off. . |
| 2591824 | 12/1985 | France . |
| 63-277859 | 11/1988 | Japan . |
| 2-31583 | 8/1990 | Japan . |
| 2091949 | 1/1982 | United Kingdom . |

*Primary Examiner*—Allan D. Herrmann
*Attorney, Agent, or Firm*—Cushman, Darby & Cushman

[57] ABSTRACT

A starter comprises a planetary gear reduction mechanism including an internal gear provided with a cylindrical chamber, a rotary disk, and a friction disk for restricting the rotary disk. The rotary disk is prevented from angularly moving with respect to the internal gear through an elastic member. When a larger load is applied to the internal gear which the elastic member cannot absorb, the rotary disk is released from the friction disk to angularly move to absorb such larger load.

9 Claims, 6 Drawing Sheets

STARTER

FIELD OF THE INVENTION AND RELATED ART STATEMENT

The present invention relates to a starter for an engine, and more particular, a starter equipped with a planetary gear speed-reduction mechanism.

When an engine is cranked by a starter, a crank rotates with pulsation due to the piston stroke displacement, i.e., compression, suction, combustion, and exhaust strokes. For this reason, a starter equipped with a planetary gear reduction mechanism cannot follow the pulsation. The impact caused by the pulsation is applied to an internal gear incorporating the planetary gear reduction mechanism installed therewith, and vibrations due to such impact cause an unpleasant noise during cranking.

A countermeasure to absorb the impact is disclosed in Japanese Utility Model Examined Publication No. 2-31583, in which an elastic member is interposed between a frame and an outer periphery of the internal gear incorporating the planetary gear reduction mechanism. Also, a technique in which an internal gear is pressed against a frame by using a frictional force is disclosed in Japanese Patent Unexamined Publication No. 63-277859.

In the former, there is a problem that the loads larger than that the elastic member can absorb cannot be dealt with, because there is a limit of the impact which the elastic member absorbs alone. To the contrary, in the latter, large loads can be absorbed by sliding therebetween, but small loads cannot be absorbed.

OBJECT AND SUMMARY OF THE INVENTION

An object of the present invention is to provide a starter which is capable of effectively absorbing a wide range of loads from the engine.

To this end, according to the present invention, there is provided a starter comprising a planetary gear reduction mechanism including a sun gear to be connected to a rotary shaft of an armature, a planetary gear engaged with the sun gear, and an internal gear including a portion thereof engaged with the planetary gear; an output shaft to which a rotation of the rotary shaft is transmitted by means of an orbital revolution of the planetary gear; a pinion provided in the output shaft, adapted to be engaged with a ring gear of an engine; a frame; and a first and a second members for holding the internal gear on the frame, the first member holding the internal gear for angularly moving against a first load which is applied to the internal gear to angularly move it, and the second member holding the internal gear for angularly moving against a second load which is applied to the internal gear to angularly move it, a magnitude of which is larger than that of the first load.

DETAILED DESCRIPTION OF THE PREFERRED EMBODIMENTS

Figure 1:
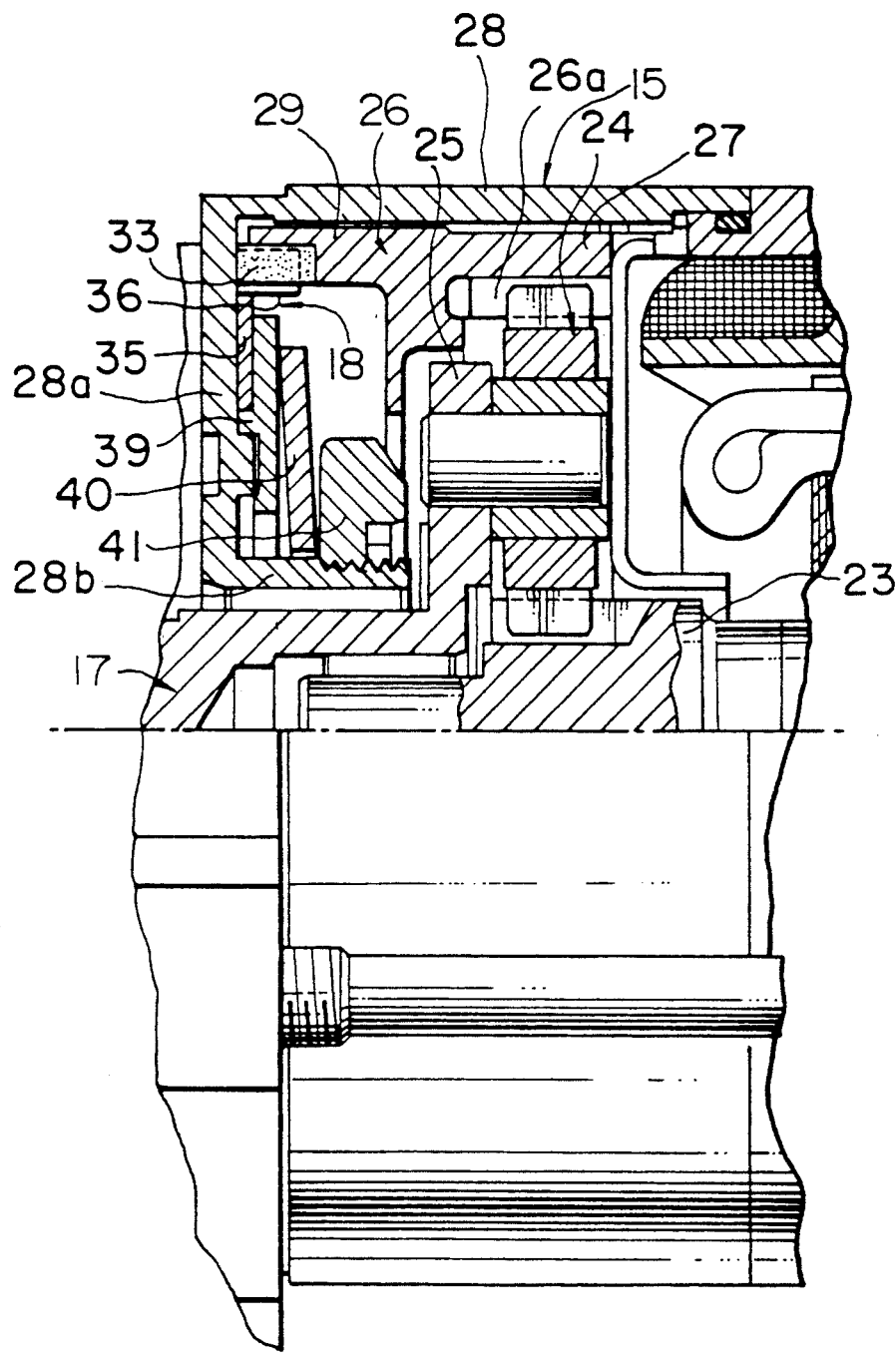
FIG. 1 is a fragmentary enlarged view showing a reduction mechanism of a starter shown in FIG. 2.
Figure 2:
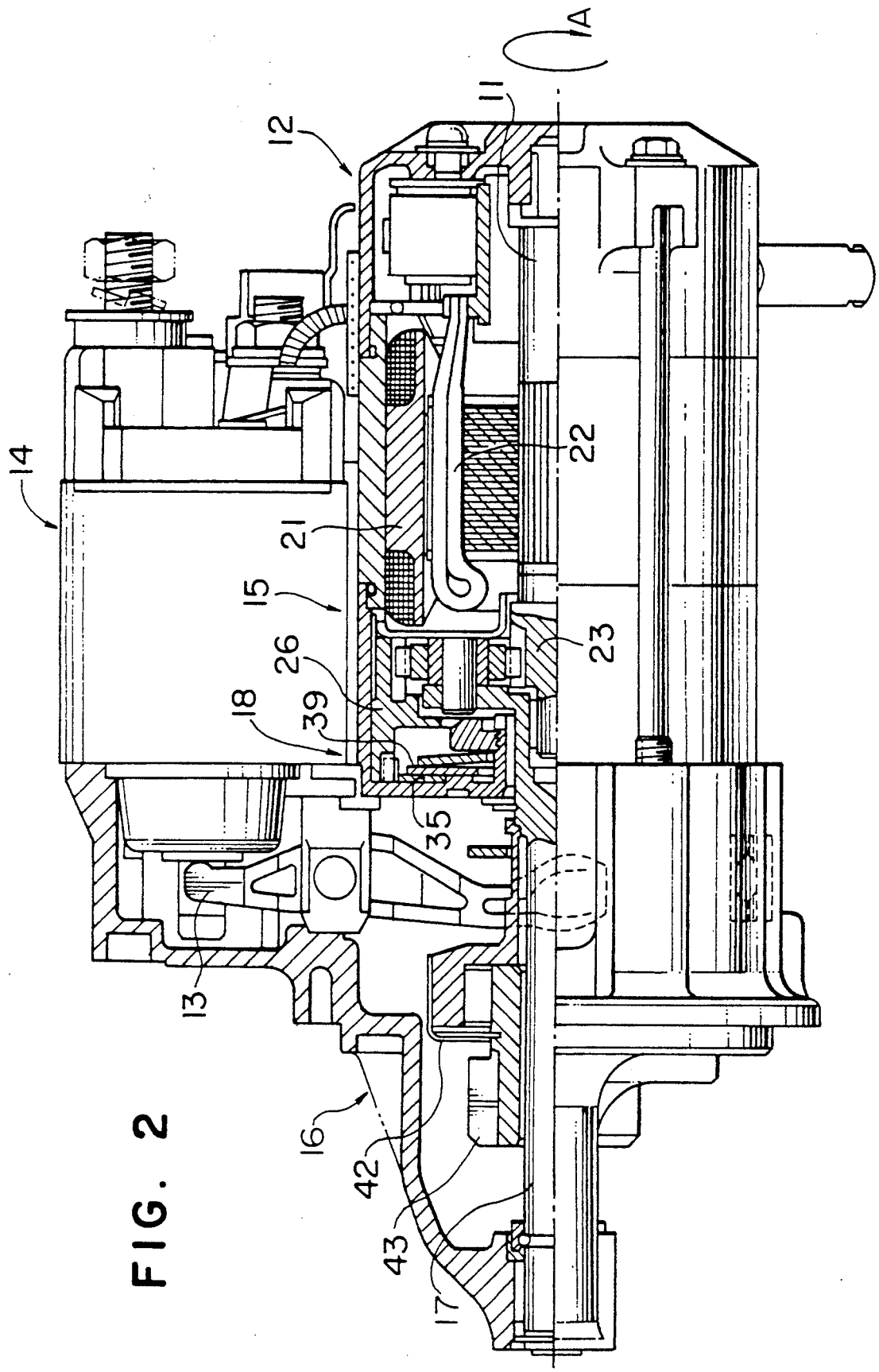
FIG. 2 is a sectional view showing the starter according to a first embodiment of the present invention.

A starter incorporating a reduction mechanism 15 shown in FIG. 1 comprises, as shown in FIG. 2, a motor block 12 which supports a rotary shaft 11 of an armature at opposite end portions of a housing, a solenoid block 14 incorporating a solenoid for driving a shift lever 13 by a starter switch (not shown), the planetary gear reduction mechanism 15 mounted on the rotary shaft 11 of the armature, an output mechanism 16 which transmits a speed reduction output from the planetary gear reduction mechanism 15 to a ring gear of a fly wheel through an output shaft 17, and means 18 for absorbing loads transmitted to the planetary gear reduction mechanism 15 from an engine.

The motor block 12 includes the rotary shaft 11, a field coil 21 and an armature winding 22 formed on the rotary shaft 11 for cooperating the field coil 21 to generate an electromagnetic force so as to rotate the rotary shaft 11.

Figure 3:
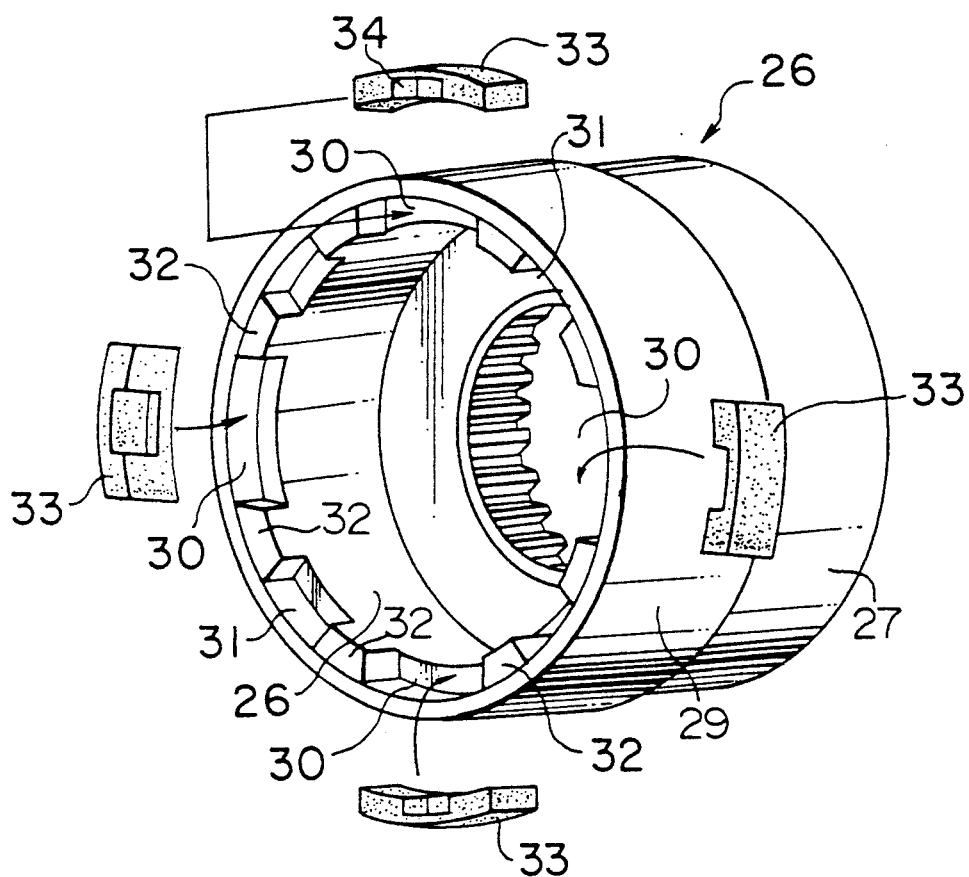
FIG. 3 is a perspective view showing an internal gear shown in FIG. 1.
Figure 4:
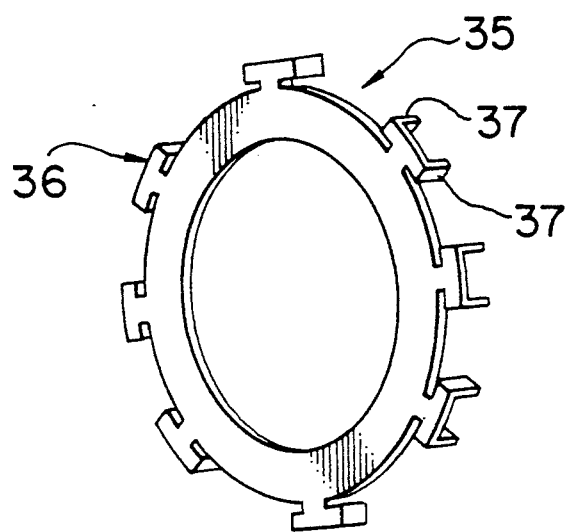
FIG. 4 is a perspective view showing a rotary disk shown in FIG. 1.
Figure 5:
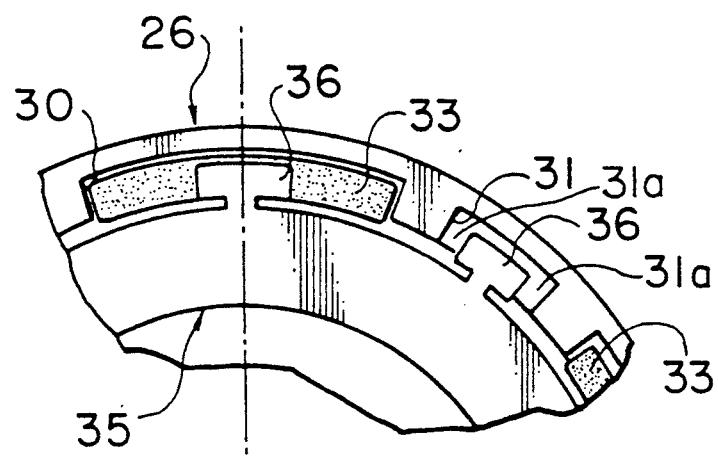
FIG. 5 is a view showing an engagement between the rotary disk and the internal gear in the starter according to the first embodiment of the present invention.

The planetary gear reduction mechanism 15, as shown in FIG. 1, includes a predetermined number of planetary gears 24, an arm 25 integrated with the output shaft 17 to support the gears 24, and an internal gear 26 angularly movably mounted, in a frame 28. The internal gear 26 includes a first cylindrical chamber 27 and a second cylindrical chamber 29 which are disposed axially in series. The gears 24 are installed inside the first cylindrical chamber 27 to be engaged with an internal gear portion 26a formed on the first cylindrical chamber 27. As shown in FIG. 3, recesses 30 and 31 are formed on the inner periphery of the second cylindrical chamber 29. The recesses comprise four first long recesses 30 equiangularly spaced from each other by 45°, and four second short recesses 31 equiangularly spaced from each other by 45°. Projections 32 are formed between the first recesses 30 and the second recesses 31. An elastic member 33 of rubber or the like is held in each of the first recesses 30. A circumferential groove 34 shorter than the short recess 31 is formed in the elastic member 33. A rotary disk 35 (FIGS. 2 and 4) which serves as the absorbing means is engaged with the second cylindrical chamber 29. Namely, projections 36 formed on the outer periphery of the rotary disk 35, shown in FIG. 4, made of phosphor bronze or the like, are fitted to the circumferential grooves 34 and the second recesses 31, as shown in FIG. 5. The projection 36, as shown in FIG. 4, is formed by bending opposite ends (claws 37 and 37) of each of circumferential pieces equiangularly spaced from each other and provided on the outer periphery of the annular disk 35. As a result of these claws 37 and 37 being fitted to the circumferential groove 34 and the second recesses 31, the rotary disk 35 is engaged with the internal gear 26 without rotation through the elastic member 33 placed therebetween. In this case, the projection 36 is close fitted to the circumferential groove 34 of the elastic member 33 without gap, but maintains opposite gaps 31a and 31a with the second recess 31 (FIG. 5).

The rotary disk 35 is slidably in contact at one surface thereof with a side wall 28a of the frame 28 supporting the output shaft 17 through a cylindrical support portion 28b thereof, and at the other surface thereof is pressed to contact a friction disk 39 of low carbon steel or the like. The rotary disk 35 and the friction disk 39 are disposed around the supporting portion 28b of the frame 28, and a coned disk spring 40 is further disposed around the supporting portion 28b. A nut 41 is screw mounted onto a thread portion formed on the supporting portion 28b to press the coned disk spring 40 so as to adjust the frictional force between the friction disk 39 and the rotary disk 35.

In the output mechanism 16, as shown in FIG. 2, an overrunning clutch 42 and a pinion 43 are mounted on the output shaft 17, and the shift lever 13 is rested on the overrunning clutch 42.

In the starter constructed as described above, the rotation of the rotary shaft 11 of the armature is in the direction of an arrow A is transmitted through the planetary gear reduction mechanism 15 to the output shaft 17 in the form of a speed reduced rotation in a reversed direction. At the same time, the shift lever 13 causes the pinion 43 to be engaged with the ring gear through the overrunning clutch 42. This causes the engine to crank.

Impacts are generated in the output shaft 17 due to the pulsations of the engine during the above cranking time. A load caused thereby is transmitted to the internal gear 26 through the planetary gear 24. When this load is small, the movement of the rotary disk 35 is prevented by the friction disk 39. Therefore, the load from the planetary gear 24 is absorbed by a circumferential deformation of the elastic member 33 held in the recess 30 of the internal gear 26. When the load received by the internal gear 26 exceeds the capacity of the elastic member 33, a rotational force larger than the frictional force of the friction disk 39 is applied to the rotary disk 35 since the claws 37 are engaged with the recess 31 without rotation. As a consequence, the rotary disk 35 is released from the restriction of the friction disk 39 and rotates slidably on the sliding surface with the frame 28, and at the same time rotates the internal gear 26. In this way, excessive impact loads can be absorbed by the rotation of the rotary disk 35 together with the internal gear 26. When the rotary disk 35 is angularly moved to a certain extent and then the elastic member 33 can absorb the load, the movement of the rotary disk 35 is restricted by the frictional force of the friction disk 39, and the absorption function by the elastic member 33 works again.

As described above, in this embodiment, a wide range of loads can be absorbed by the elastic member 33 and the friction disk 39 which restricts the rotary disk, 35 by a frictional force. Namely, a small load can be absorbed by the elastic member 33 and a large load can be absorbed by the rotation of the rotary disk 35 with the internal gear 26. The absorbing means 18 having such double absorption functions is accomplished without increasing the diametrical size of the frame 28 because the absorbing means 18 is installed within the internal gear 26.

Figure 6:
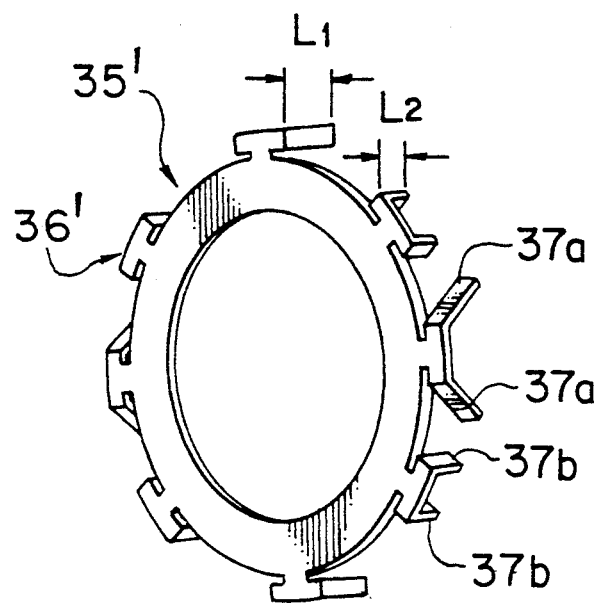
FIG. 6 is a perspective view showing a rotary disk of a starter according to a second embodiment of the present invention.
Figure 7:
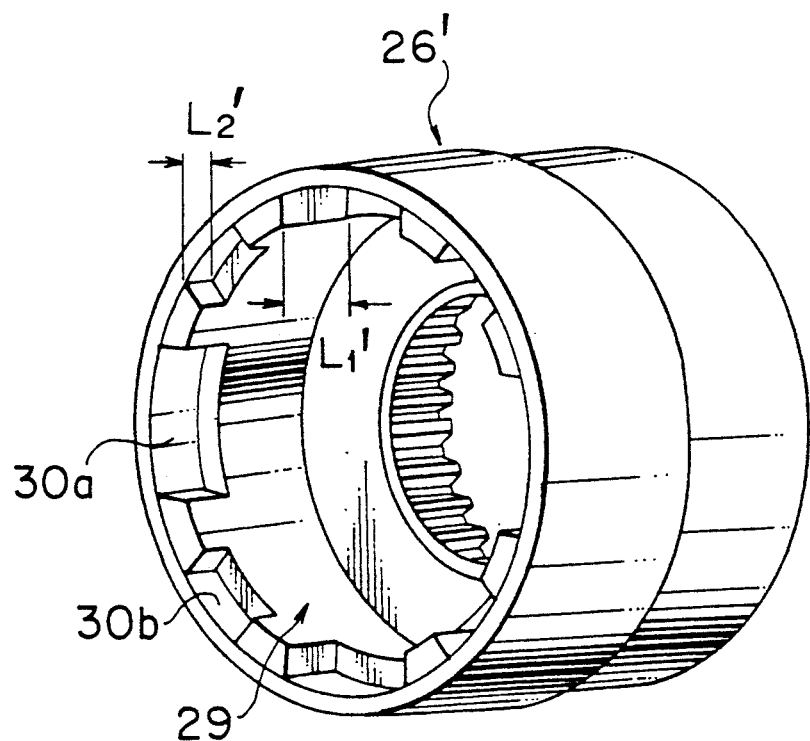
FIG. 7 is a perspective view showing an internal gear of the starter according to the second embodiment of the present invention.

Next, the second embodiment of the present invention will be described with reference to FIGS. 6 and 7. The rotary disk 35' has two groups of projections 36' formed by bending opposite ends (claws 37a and 37a, and 37b and 37b) of each of circumferential pieces equiangularly spaced from each other and provided on the outer periphery of the disk 35. The axial lengths of the claws 37a and 37b are different from each other. The claw 37a having an axial length L1 and the claw 37b having an axial length L2 smaller than L1 are circumferentially disposed alternately. The claws 37a and 37a are flared to provide a resiliency to the projection 36'. The second cylindrical chamber of the internal gear 26 is provided with first recesses 30a each having an axial depth L1' and second recesses 30b each having an axial depth L2' smaller than L1', these depths corresponding to the axial lengths L1 and L2 of the claws 37a, 37a and 37b, 37b, respectively. The pairs of claws 37a and 37a and the pairs of claws 37b and 37b are fitted into the first recesses 30a and the second recesses 30b, respectively. The pair of claws 37a and 37a are closely fitted to the first recess 30a. To the contrary, the pair of claws 37b and 37b are loosely fitted to the second recess 30b as the same as the first embodiment.

According to the second embodiment, when the small load is applied to the rotary disk 35', the pair of claws 37a and 37a work as resilient members so that they are deformed to be closed to each other, thereby absorbing such small load as the same as the elastic member 33 of the first embodiment. When the large load which the pairs of claws 37a and 37a cannot absorb is applied to the rotary disk 35', it is rotated by a rotational force, which is larger than the restriction force due to the frictional force of the friction disk 39, so as to absorb such large load. As a result, like the first embodiment, the rotary disk 35' circumferentially moves with the internal gear 26 to a certain extent to absorb the large load, and thereafter, the pairs of claws 37a and 37a absorb the reduced load again.

Figure 8:
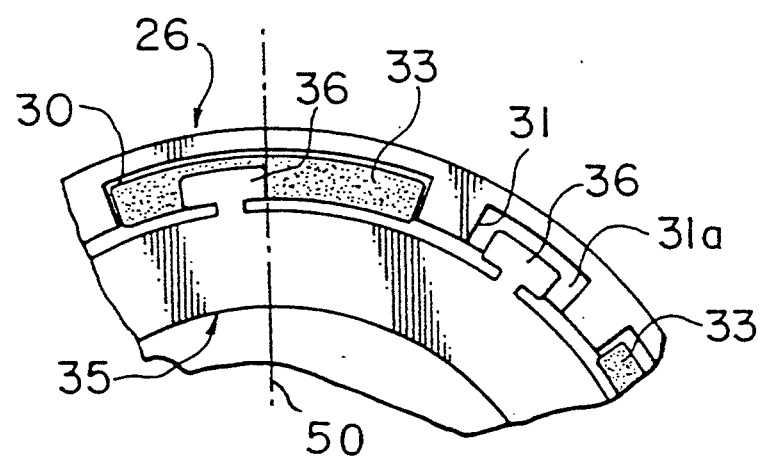
FIG. 8 is a view showing an engagement in the starter according to a third embodiment of the present invention.

In a third embodiment, as shown in FIG. 8, the position of the projection 36 of the rotary disk 35 is modified with respect to the recess 30 of the internal gear 26 in view of the engine type. Each of the projections 36, which is housed in the circumferential groove 34 of the elastic member 33, is asymmetrical with a circumferential center line 50 of the respective groove 34. All of such projections 36 are deviated in the same direction.

According to the third embodiment, in case that the starter is applied to an engine which has an intention of generating a specifically inclined load, the elastic members 33 can absorbed such load more effectively.

As apparent from the above description, according to the present invention, due to the double absorption function, it is possible to absorb a wider range of load, as compared with the single absorption function in which the load is absorbed by the elastic members only.

What is claimed is:

1. A starter comprising:
   a planetary gear reduction mechanism including a sun gear to be connected to a rotary shaft of an armature, a planetary gear engaged with said sun gear, and an internal gear including a portion thereof engaged with said planetary gear;
   an output shaft to which a rotation of said rotary shaft is transmitted by means of an orbital revolution of said planetary gear;
   a pinion provided in said output shaft, adapted to be engaged with a ring gear of an engine;
   a frame; and
   a first and a second member for holding said internal gear on said frame, said first member holding said internal gear for angularly moving against a first load which is applied to said internal gear to angularly move it, and said second member holding said internal gear for angularly moving against a second load which is applied to said internal gear to angularly move it, a magnitude of which is larger than that of said first load, said internal gear being of generally cylindrical shape having first and second inner peripheral portions, said first inner peripheral portion including an internal gear portion engaging a planetary gear, the second inner peripheral portion engaging recess portions, and the first and second members being housed within said internal gear, said first member including a projection and an elastic member which engage with the recess portions, said second member including a projection engaged with the recess portions so as to define a gap therebetween to permit relative rotation of the internal gear, thereby absorbing an impact when the first load is applied.

2. A starter comprising:
a planetary gear reduction mechanism including a sun gear to be connected to a rotary shaft of an armature, a planetary gear engaged with said sun gear, and an internal gear including an internal gear portion engaged with said planetary gear including an internal gear portion engaged with said planetary gear and an engaging portion;
an output shaft to which a rotation of said rotary shaft is transmitted by means of an orbital revolution of said planetary gear;
a pinion provided in said output shaft, adapted to be engaged with a ring gear of an engine;
a frame;
means angularly movably mounted to said frame, said means including a first and a second portion engageable with said engaging portion of said internal gear, said first portion resiliently engaging with said engaging portion of said planetary gear reduction mechanism and being deformable for permitting said internal gear to angularly move against a first load which is applied to said internal gear to angularly move it, and said second portion adapted to be engaged with said engaging portion of said planetary gear reduction mechanism to transmit a first load applied to said internal gear to said movable means when said first portion is deformed beyond a predetermined extent; and
a friction member abutted to said movable means to restrict an angular movement of said movable means with respect of said frame, said friction member providing a slip between said movable means and said friction member when a second load is applied to said internal gear, magnitude of which is larger than that of said first load, after engagement between said second portion and said engaging portion;
said internal gear being of generally cylindrical shape having first and second inner peripheral portions, said first inner peripheral portion including the internal gear portion engaging the planetary gear, the second inner peripheral portion including the engaging portion, said engaging portion of said internal gear being recess portions,
said first portion of said movable means including a projection which resiliently engage with the recess portions, said second portion of said movable means including projections engaged with the recess portions so as to define a gap therebetween to permit a relative rotation of the internal gear, thereby absorbing an impact when the first load is applied.

3. A starter according to claim 2, further comprising an elastic member disposed between said first portion of said movable means and said recess portion of said internal gear in a closely fitted manner.

4. A starter according to claim 2, wherein said projections include a pair of claws which are flared to provide resiliency thereto.

5. A starter comprising:
a planetary gear reduction mechanism including a sun gear to be connected to a rotary shaft of an armature, a planetary gear engaged with said sun gear, and an internal gear provided at one axial end portion thereof with an internal gear portion formed on an inner wall of said end portion for being engaged with said planetary gear and at the other axial end portion thereof with a plurality of engaging portions disposed circumferentially;
an output shaft to which a rotation of said rotary shaft is transmitted by means of an orbital revolution of said planetary gear;
a pinion provided in said output shaft, adapted to be engaged with a ring gear of an engine;
a frame;
means including at an inner peripheral portion thereof a ring portion being held angularly movably with respect to said frame, and at an outer peripheral portion thereof, first and second portions engageable with said engaging portions of said internal gear, said first portions being disposed asymmetrically with respect to a circumferential center line of the engaging portion, said first portions resiliently engaging with said engaging portions of said planetary gear reduction mechanism and being deformable for permitting said internal gear to angularly move against a first load which is applied to said internal gear to angularly move it, and said second portions adapted to be engaged with said engaging portions of said planetary gear reduction mechanism to transmit a first load applied to said internal gear to said movable means when said first portions are deformed beyond the predetermined extent; and
a friction member axially abutted to said ring portion of said movable means to restrict an angular movement of said movable means with respect to said frame, said friction member providing a slip between said movable means and said friction member when a second load is applied to said internal gear, magnitude of which is larger than that of said first load, after engagement between said second portions and said engaging portions.

6. A starter according to claim 5, wherein said starter further comprises an elastic member disposed between said first portion of said movable means and said engaging portion of said internal gear.

7. A starter according to claim 5, wherein said first portion of said movable means is constituted by deformable member.

8. The starter according to claim 5, wherein the engaging portions of the internal gear are recess portions, said first and second portions having outer peripheral portions which engage the recess portions.

9. A starter comprising:

a planetary gear reduction mechanism including a sun gear to be connected to a rotary shaft of an armature, a planetary gear engaged with said sun gear, and an internal gear including a portion thereof engaged with said planetary gear;

an output shaft to which a rotation of said rotary shaft is transmitted by means of an orbital revolution of said planetary gear;

a pinion provided in said output shaft, adapted to be engaged with a ring gear of an engine;

a frame; and a first and a second member for holding said internal gear on said frame, said first member holding said internal gear for angularly moving against a first load which is applied to said internal gear to angularly move it, and said second member holding said internal gear for angularly moving against a second load which is applied to said internal gear to angularly move it, a magnitude of which is larger than that of said first load, said internal gear being generally cylindrical in shape and having first and second inner peripheral portions, said first inner peripheral portion including an internal gear portion engaging a planetary gear, the second inner peripheral portion engaging recess portions, and the first and second members being housed within said internal gear and being engaged with the recess portions, said recess portions including a series of first and second alternating recesses, said first recess being wider than the second recess, and elastic member being disposed within each said first recess, said first member including projections which are fitted to said elastic members, said second member including second projections which engage said second recesses.

* * * * *